United States Patent Office 2,983,749
Patented May 9, 1961

2,983,749
PREPARATION OF BENZYL CARBONATES

James W. Shepherd, Mars, Pa., assignor to Callery Chemical Company, Pittsburgh, Pa., a corporation of Pennsylvania No Drawing. Filed Nov. 10, 1958, Ser. No. 772,730

4 Claims. (Cl. 260—463)

This invention relates to benzyl carbonates and their preparation and more particularly to dibenzyl carbonate and benzyl methyl carbonate and a method for their preparation in which the carbonating agent is sodium methyl carbonate.

Organic carbonates have been previously prepared by various methods, such as, for example, the reaction of alcohols with phosgene. However, the economic importance of these carbonates has been limited because of the low yields obtained and expensive reactants required in the ordinary processes used for their manufacture.

I have now found that certain organic carbonates, i.e., benzyl carbonates, may be easily and economically prepared through the use of sodium methyl carbonate as the carbonating agent. Sodium methyl carbonate, $$NaCH_3CO_3$$

is an inexpensive but relatively new compound which possesses a unique combination of organic and inorganic properties. It is a white solid, and is soluble in certain solvents, such as glycols, but insoluble in most hydrocarbons.

The process of this invention comprises the reaction of sodium methyl carbonate with benzyl chloride, in the presence of a tertiary amine catalyst, to produce dibenzyl carbonate, $(C_6H_5CH_2)_2CO_3$, and benzyl methyl carbonate, $C_6H_5CH_2CO_3CH_3$. A by-product of the reaction is sodium chloride. The benzyl carbonates thus produced are useful as plasticizers in various formulations, and in addition are important intermediates in organic synthesis. Benzyl methyl carbonate is an unusual and particularly valuable carbonate for synthetic applications because of its unsymmetrical structure. This carbonate, having both a methyl and a benzyl group attached to the carbonate radical, is obtained as one product when sodium methyl carbonate is used as the carbonating agent in the method described herein which makes this process uniquely valuable.

Although the above described reaction takes place upon contacting the reactants and the catalyst at room temperature, the rate of the reaction is extremely slow at these low temperatures so that it is preferred to heat the reaction mixture. In ordinary practice the reaction mixture is refluxed, i.e., heated to the reflux temperature of the lowest boiling component in the mixture, which results in a satisfactory rate of reaction but which avoids the necessity for elevated pressures. However, if desired, higher temperatures and pressures above atmospheric may be used.

Any tertiary amine may be used as the catalyst for the reaction. Some such amines are, for example, triethylamine, trimethylamine, trihexylamine, dibutyloctylamine dimethyloctadecylamine, diisopropyl (ethoxybenzyl) amine, methyl morpholine, and butyl morpholine.

In one test illustrating the method and practice of this invention, 20 grams (0.2 mol) of sodium methyl carbonate, 55 milliliters (0.4 mol) of benzyl chloride, and 20 milliliters of triethylamine were placed in a glass reaction flask and heated to reflux for two hours. The product mixture was washed with water, then with a 10% hydrochloric acid solution, and the product layer was separated and dried. Vacuum distillation yielded 4.6 grams of unreacted benzyl chloride, 26.6 grams of dibenzyl carbonate, $(C_6H_5CH_2)_2CO_3$, and 10.95 grams of benzyl methyl carbonate, $C_6H_5CH_2CO_3CH_3$. Identification of the products were made using conventional analytical techniques, including infra-red analyses and melting point and boiling point data.

According to the provisions of the patent statutes, I have explained the principle and mode of practicing my invention, have described what I now consider to be its best embodiment. However, I desire to have it understood that, within the scope of the appended claims, the invention may be practiced otherwise than as specifically described.

I claim:
1. A method of producing dibenzyl carbonate which comprises reacting benzyl chloride with sodium methyl carbonate, using a molar ratio of benzyl chloride to sodium methyl carbonate of at least about 2 to 1, in the presence of a tertiary amine catalyst, and recovering the dibenzyl carbonate thus formed.
2. A method according to claim 1 and carried out at the reflux temperature of the reaction mixture.
3. A method of producing dibenzyl carbonate which comprises reacting benzyl chloride with sodium methyl carbonate, using a molar ratio of benzyl chloride to sodium methyl carbonate of at least about 2 to 1, in the presence of triethylamine, and recovering the dibenzyl carbonate thus formed.
4. A method according to claim 3 and carried out at the reflux temperature of the reaction mixture.

References Cited in the file of this patent
UNITED STATES PATENTS

| | | |
|---|---|---|
| 2,648,678 | Heiberger | Aug. 11, 1953 |
| 2,784,201 | Chitwood | Mar. 5, 1957 |

OTHER REFERENCES

Wagner and Zook: "Synthetic Organic Chemistry," 1953, page 484.